United States Patent [19]

Koetsch

[11] Patent Number: 5,154,552

[45] Date of Patent: Oct. 13, 1992

[54] QUICK-RELEASE ARBOR FOR HOLE SAWS

[75] Inventor: Paul W. Koetsch, Springfield, Mass.

[73] Assignee: American Saw & Mfg. Company, Longmeadow, Mass.

[21] Appl. No.: 815,495

[22] Filed: Dec. 31, 1991

[51] Int. Cl.⁵ .............................................. B23B 51/04
[52] U.S. Cl. ................................... 408/204; 408/209
[58] Field of Search ............... 408/204, 206, 209, 225, 408/703; 144/20, 23

[56] References Cited

U.S. PATENT DOCUMENTS

| | | | |
|---|---|---|---|
| 3,267,975 | 8/1966 | Enders | 408/206 |
| 3,758,221 | 9/1973 | Meshulam | 144/20 |
| 3,784,316 | 1/1974 | Bittern | 408/204 |
| 3,837,759 | 9/1974 | Bittern | 408/204 |
| 4,036,560 | 7/1977 | Clark et al. | 408/204 |
| 4,148,593 | 4/1979 | Clark | 408/204 |
| 4,968,189 | 11/1990 | Pidgeon | 408/209 |
| 5,035,550 | 7/1991 | Ajima | 408/204 |

*Primary Examiner*—Daniel W. Howell
*Attorney, Agent, or Firm*—Chapin, Neal & Dempsey

[57] ABSTRACT

Quick-release arbor for hole saws has a generally cylindrical shaft with a threaded end portion for a screw-fitted connection to the threaded bore of a hole saw. A collar is disposed about the shaft, includes a shank, at one end, adapted for connection to a power driven chuck and, at its other end, a pair of diametrically spaced-apart drive-pins. The collar and shaft are characterized, respectively, by inner and outer diameters which provide a clearance therebetween so that the collar and the shaft are both axially movable and rotatable relative to each other. A retainer carried by the collar and another retainer carried by the shaft for interengagement with the one retainer.

5 Claims, 2 Drawing Sheets

QUICK-RELEASE ARBOR FOR HOLE SAWS

BACKGROUND OF THE INVENTION

This invention relates to hole saw arbors and more particularly to arbors that are adapted for quick attachment and release to and from hole saws and which solves the problem of hole saw wobble.

In the prior art there have been a number of quick release hole saw arbors, such as U.S. Pat. No. 3,758,221, dated Sep. 11, 1973, assigned to Black & Decker Manufacturing Company. This patent shows a lock plate and fastener nut for attaching the drive shaft to hole saws of various diameter. Other such arbors are disclosed in U.S. Pat. No. 3,784,316, dated Jan. 8, 1974, and U.S. Pat. No. 3,837,759, dated Sep. 24, 1974, both assigned to Capewell Manufacturing Company, as well as U.S. Pat. No. 4,036,560, dated Jul. 19, 1977, and U.S. Pat. No. 4,148,593, dated Apr. 10, 1979, both assigned to Stanadyne, Inc. While these prior patents show various means for connecting and disconnecting drive arbors from a power source to hole saws of various diameters, they do not solve the problem of hole saw wobble resulting from almost always having to "back-off" the threaded connection between the arbor and the hole saw in order to line up the drive pins of the arbor with the drive holes of the hole saw. In this condition, if one shakes the assembly, the hole saw will wobble in a manner suggestive of a "dinner bell", hence called the "dinner bell" effect.

More recently, U.S. Pat. No. 5,035,550, dated Jul. 30, 1991, assigned to House B.M. Co., Ltd., discloses a mechanism for connecting a hole saw to a drive shaft to solve the wobble problem. In that patent, however, the hole saw is not the conventional type, but is specially designed for that purpose. It is open at both ends and includes a bolt 6 adapted to be screw-fitted in a threaded hole within the hole saw body. While this structure would overcome the problem of hole saw wobble, it could not be used for connection to conventional hole saws which, in sizes of 1¼ inch and larger, have a threaded central bore and radially offset drive holes in the base thereof.

The principal object of this invention is to provide a novel arbor construction for quick and easy attachment and release to and from conventional hole saws which overcomes the problem of hole saw wobble.

Another object of this invention is to provide an arbor construction of the above type which enables the threaded central member to be snugly screwed by clockwise rotation into the bore of a hole saw and by continued clockwise rotation of a rotatable drive collar to align its drive pins with the drive holes of the hole saw.

The above and other objects and advantages of this invention will be more readily apparent from the following description read in conjunction with the accompanying drawings, in which.

Figure 5:
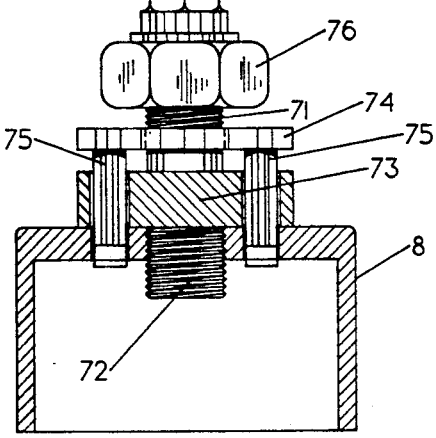
FIG. 5 is an elevational view, partly in section, showing a typical quick-disconnect arbor which is currently the state-of-the-art.

A typical hole saw arbor indicative of the current state-of-the-art, shown in FIG. 5, is releasably connected to conventional hole saws 8 but, as will be more fully described hereinafter, that arbor does not overcome the problem of hole saw wobble.

Figure 1:
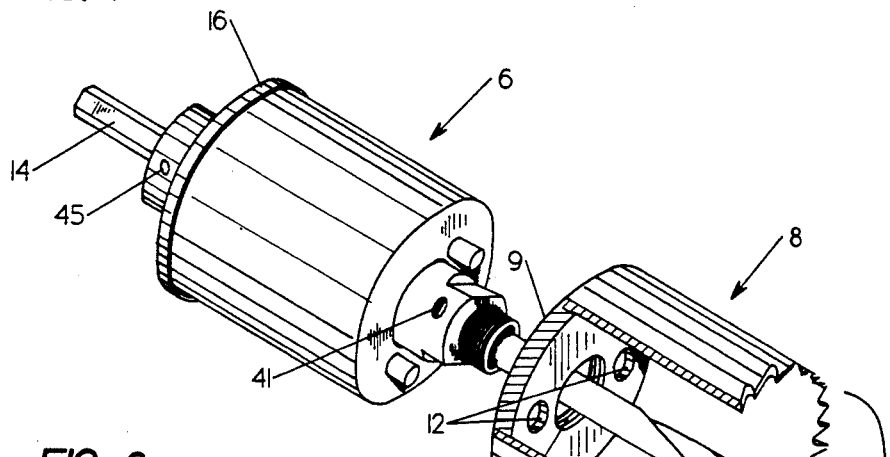
FIG. 1 is a perspective view of an arbor of the type embodying this invention ready to be attached to a hole saw.

Referring now in detail to the drawings, at 6 in FIG. 1, is shown a quick-release arbor of the type embodying this invention ready to be attached to hole saws 8 of conventional construction of 1¼ inch and larger in diameter. Such hole saws include a planar base 9 with a threaded central bore 10 and a pair of drive holes 12 extending therethrough in diametrically spaced relation on opposite sides of the bore 10. In accordance with this invention, the arbor comprises a drive collar 18 (FIG. 2) coaxially disposed about a cylindrical shaft 20 and being axially movable and rotatable relative to the shaft. The shaft has a threaded end portion 22 adapted to be screw-fitted into bore 10 and the collar 18 includes pins 26 adapted to fit into holes 12 of the hole saw.

Figure 2:
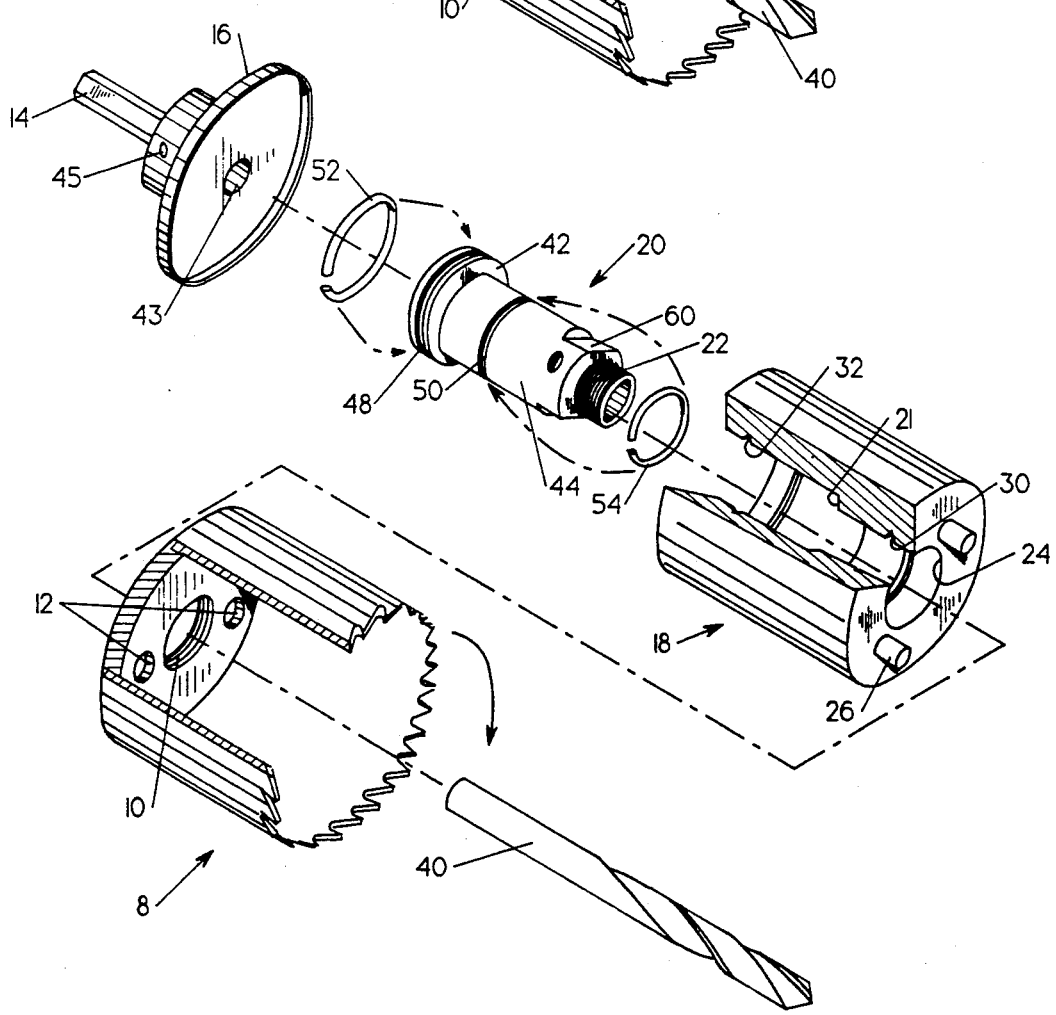
FIG. 2 is an exploded perspective view of the arbor, as shown in FIG. 1.

The collar comprises a tubular shank 14 of polygonal cross-section coaxially extending from a circular cap 16 which may be appropriately secured, such as by threading or welding to the upper end of the collar 18 disposed about the shaft 20 (FIG. 2). The collar is of generally cylindrical tubular construction and is preferably of uniform outer diameter throughout its length and is of stepped inner diameter, the junction of which is provided by annular shoulder 21. The shoulder serves as a limit stop for the outward movement of the shaft 20. As illustrated, the collar 18 is "open" at its upper end to receive the shaft therein before the cap 16 is secured thereto. The threaded end 22 of the shaft 20 is adapted to extend through the opening 24 at the lower end of the collar for screw-fitting into bore 10. Disposed diametrically on opposite sides of the hole 24, are a pair of pins 26 dimensioned to interfit within the holes 12 in the base of the hole saw. The pins 26 may be cylindrical, or may be outwardly tapered, or divergent in cross-section toward their outer ends, to minimize the tendency of the saw to loosen during a cutting operation. The inner cylindrical surfaces of the collar 18 are provided with axially-spaced retainers, or detents which, in the embodiment shown, take the form of axially-spaced annular grooves 30 and 32 disposed about the inner circumference of the collar 18. Groove 30 is located on the surface of lesser diameter below the shoulder 21, whereas groove 32 is located on the surface of larger diameter above the shoulder 21.

The shaft 20 is adapted to be fitted within the collar 18 which is also of generally stepped cylindrical cross-section. At its outer end, the shaft 20 includes an externally threaded stem portion 22 adapted to be screw-fitted into the internally threaded central bore 10 of the hole saw 8. The shaft 20 may be tubular, or hollow at is lower end, or throughout its length, to receive the shank end of a pilot-drill 40 which may be secured therein by means of a radially extending set-screw 41. The shank 14 may also be tubular throughout its length, as shown at 43 in FIG. 3, whereby the set-screw may be disposed to extend through the shaft 20, as shown, to secure the pilot-drill in place. Alternatively, by providing longer drill bits, the set-screw may be disposed in a threaded hole 45 through the wall of the shank 14 to lock the drill in place therein. The shaft 20, from one end to the other, is of stepped-diameter having an inner end portion 42, an intermediate body portion 44 and the stem 22 at the outer end thereof.

The outer diameters of shaft 20 and inner diameters of collar 18 are selected so that the shaft will interfit closely within the collar with a free sliding clearance to provide for both the rotation and axial movement of the shaft and collar relative to one another. The shaft 20 is provided with grooves 48 and 50 adapted respectively to receive therein retainers or detents in the form of spring-ring members 52 and 54 comprising open-ended annular members which are spring tensioned when radially or diametrically compressed. In their untensioned condition, the rings have a larger outer diameter than the inner diameter of the collar 18 whereby the outer portions thereof extend within the clearance, or are interposed, between the shaft and the collar. Thus, when the retainers or the spring-rings 52 and 54 are in axial alignment with the retainers or grooves 32 or 30 within the collar 18, the rings will expand outwardly and thus releasably retain the shaft 20 and the collar 18 in fixed axially relation. Nonetheless, in this construction, both the collar and shaft will still be relatively rotatable, as will hereinafter be more fully described. The shaft 20, adjacent its stem portion 22, includes a pair of oppositely disposed flats 60 for engagement by the jaws of a wrench which may, or may not, be necessary to tighten securely the threaded stem 22 of the shaft in the bore 10 of the hole saw.

The prior art hole saw arbor, illustrated in FIG. 5, is shown connected to a hole saw 8 of the same type as described above. The arbor comprises a spindle having a drive shank 70 at its upper end, an intermediate threaded portion 71 and a lower threaded portion 72 to be threaded into the central hole of the arbor saw 8. The spindle also includes a fixed flange 73 disposed between the two threaded portions thereof. An axially movable locking plate 74 has drive pins 75 extending from the lower surface thereof and a lock nut 76 is threaded onto the section 71 of the spindle for securing the pins 75 in driving relation with the drive holes of the hole saw 8. In using this device, the lower threaded portion 72 is first screw-fitted into the central hole of the hole saw until the lower surface of flange 73 abuts the upper surface of the hole saw. It is most unlikely, under the law of probability, that the pins would be aligned with the drive holes of the hole saw. Since the lock plate 74 is not rotatable relative to the spindle, the only way that such alignment can be achieved, is by "backing off" the spindle until the pins are aligned with the drive holes. The lock plate may then be moved axially downward to fit the pins into the drive holes, as depicted. Finally, the nut 76 may be tightened down to secure the arbor and saw in assembled relation.

Figure 3:
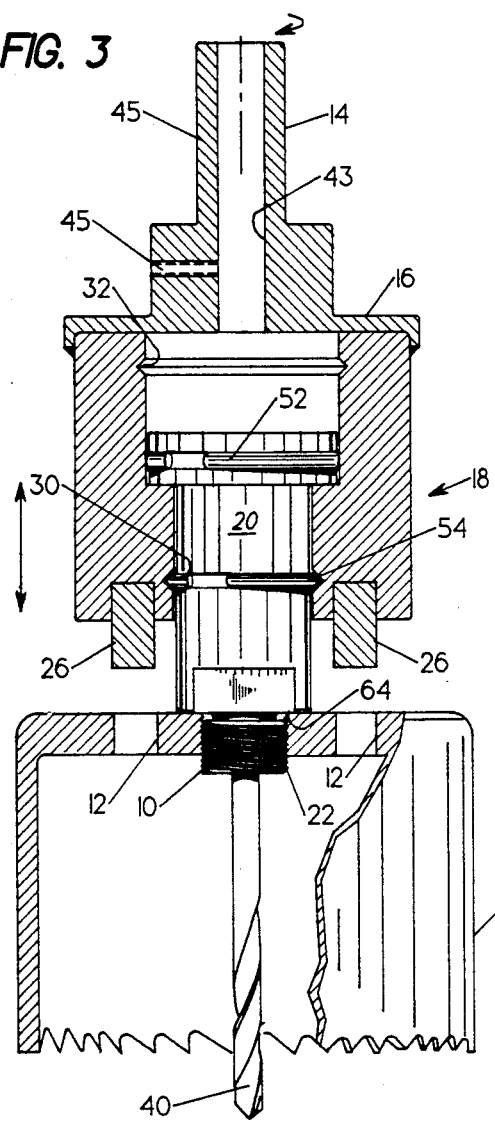
FIG. 3 is a cross-sectional view of the arbor aligned with and ready for attachment to a hole saw.
Figure 4:
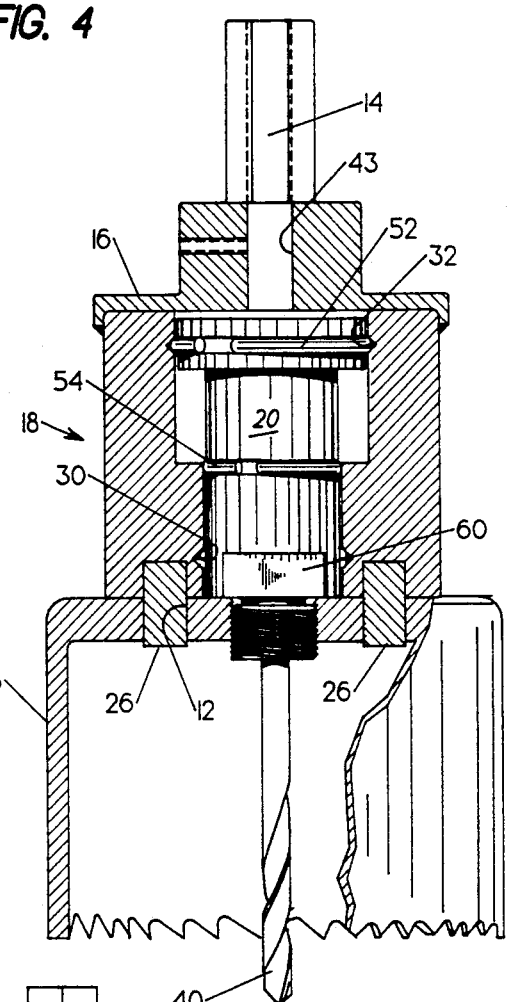
FIG. 4 is a view similar to FIG. 3 in which the hole saw arbor is shown attached to the hole saw.

The quick-release arbor embodying this invention, unlike the prior art devices, is readily attachable to a hole saw 8 in two easy steps, as illustrated in sequence in FIGS. 3 and 4. First, with the collar 18 in its retracted position, as shown in FIG. 3, the externally threaded stem 22 of the shaft may be screw-fitted into the internally threaded bore 10 of the hole saw 8 by rotating the shaft clockwise, in a conventional manner, until the shoulder 64 of the shaft abuts the upper surface of the hole saw. In this way, the two parts are snugly fitted together, either by hand or with the assistance of a wrench. With spring-ring 54 disposed in groove 30, as shown in FIG. 3, the collar 18 will be retained in its retracted position, but is yet rotatable about the shaft 20. In contrast to the prior art, the next step, regardless of the degree of misalignment of the pins 26 and holes 12, is simply to continue to rotate the collar 18 relative to the shaft until the pins 26, disposed in the lower end surface of the collar, are registered or aligned with the drive holes 12 of the hole saw. The collar 18 may then be readily moved downward or axially with respect to the shaft 20 to its extended position, as in FIG. 4, so that the drive pins are fitted into the drive holes 12 of the hole saw. Significantly, this can be accomplished without first backing off the threaded engagement of the shaft 20 and hole saw 8.

With a power source connected to the shank 14 of the arbor and the saw 8 being rotated thereby, the hole saw 8 will actually be driven by the drive pins 26 on the collar while the shaft 20 is being rotated by the hole saw. Detachment of the hole saw can also be accomplished by simply moving the collar 18 to its retracted position (FIG. 3) and then unscrewing the threaded stem portion of the shaft from the hole saw. It will be realized that the threaded connection should not be any tighter than it was before drilling, since the hole saw is driven by the pins 26 and not the threaded stem 22 of shaft 20.

Having thus described my invention, what is claimed is:

1. In an arbor for releasable attachment to a hole saw including a base with a threaded central bore and drive holes spaced outwardly of the bore and having a cylindrical shaft with a threaded end portion for connection to said central bore and adapted to receive therein a pilot-drill bit, a collar having, at one end thereof, a shank adapted for connection to a drive chuck and, at its other end, depending drive pins and having a retracted position with the pins clear of said drive holes and an extended position in which said pins are engaged with said drive holes, the improvement comprising the collar and shaft having inner and outer diameters dimensioned respectively to provide peripheral clearance therebetween so that the collar and shaft are both axially movable and rotatable relative to each other and a retainer having a portion thereof interposed between the shaft and the collar to releasably retain the collar in its retracted and extended positions.

2. An arbor for releasable attachment to a hole saw having a base with a threaded central bore and drive holes spaced outwardly of the bore comprising:
 (a) a cylindrical shaft having a threaded end portion for connection to said central bore and adapted to receive therein a pilot drill bit;
 (b) a collar having, at one end thereof, a shank adapted for connection to a drive chuck and, at its other end, depending drive pins and having a retracted position with the pins clear of said drive holes and an extended position in which said pins are engaged with said drive holes;
 (c) said collar and shaft having inner and outer diameters respectively to provide peripheral clearance therebetween so that the collar and shaft are both axially movable and rotatable relative to each other, and
 (d) one retainer carried by the collar and another retainer carried by the shaft, the retainers being axially disposed and circumferentially configured and being interengageable for releasably retaining the collar in said retracted position while enabling rotation of the shaft for threading the same snugly into said central bore in said retracted position and to thereafter to enable rotation of the collar about said shaft to register said drive pins with said drive holes.

3. An arbor for releasable attachment to a hole saw, as set forth in claim 2, in which the retainers comprise detent portions disposed on the collar and shaft and which include at least one resilient spring member for releasably urging the detent portions into engagement with each other.

4. An arbor for releasable attachment to a hole saw, as set forth in claim 2, in which said retainers comprise a plurality of detents, including one or more recesses and a spring urged recess-engaging member for selective engagement with said recesses in said retracted and extended positions.

5. An arbor for releasable attachment to a hole saw, as set forth in claim 4, in which said recess-engaging member comprises an open-ended spring-ring carried on the shaft.

* * * * *